United States Patent [19]
Duennenberger et al.

[11] 3,909,436
[45] Sept. 30, 1975

[54] DISINFECTANT COMPOSITION INCLUDING A SUBSTITUTED 2-HYDROXY BENZOPHENONE

[75] Inventors: Max Duennenberger, Frenkendorf; Max Schellenbaum, Muttenz, both of Switzerland

[73] Assignee: Ciba-Geigy AG, Basel, Switzerland

[22] Filed: Apr. 16, 1973

[21] Appl. No.: 352,378

Related U.S. Application Data

[62] Division of Ser. No. 53,026, July 7, 1970, abandoned.

[30] Foreign Application Priority Data
July 17, 1969 Switzerland............... 10936/69

[52] U.S. Cl.................................. 252/107; 252/106
[51] Int. Cl.² .................................. C11D 3/48
[58] Field of Search........................... 252/106, 107

[56] References Cited
UNITED STATES PATENTS

| | | | |
|---|---|---|---|
| 2,419,553 | 4/1947 | Houtman | 260/591 |
| 2,486,961 | 11/1949 | Meyer | 117/138.5 |
| 3,503,886 | 3/1970 | Casely et al. | 252/107 |
| 3,761,418 | 9/1973 | Parran | 252/106 |

OTHER PUBLICATIONS
Chem. Abs., 47, Abs. No. 2358c (1953).

Primary Examiner—Benjamin R. Padgett
Assistant Examiner—E. A. Miller

[57] ABSTRACT

The present invention provides a method for combating harmful microorganisms, which comprises applying to a desired site an effective amount of 2-hydroxybenzophenone of the formula

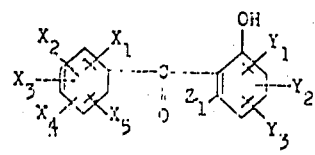

wherein $Z_1$ denotes halogen or alkyl, $X_1$ and $Y_1$ each denote hydrogen, halogen, alkyl, cycloalkyl, benzene or substituted benzene, $X_2$, $X_3$, $X_4$, $Y_2$ and $Y_3$ each denote hydrogen, halogen or alkyl and $X_5$ denotes hydrogen or halogen, with the number of the alkyl, benzene and cyclohexyl radicals as substituents being together at most 4. The anti-bacterial range of these 2-hydroxy benzophenones extends both to gram-positive and gram-negative bacteria.

6 Claims, No Drawings

DISINFECTANT COMPOSITION INCLUDING A SUBSTITUTED 2-HYDROXY BENZOPHENONE

This is a division of application Ser. No. 53,026, filed on July 7, 1970, now abandoned.

The subject of the present invention is the use of 2-hydroxybenzophenones of formula (1) 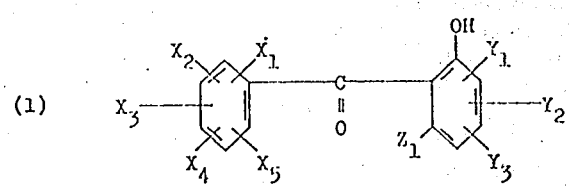

wherein $Z_1$ denotes a halogen atom or an alkyl group, $X_1$ and $Y_1$ each denote a hydrogen or halogen atom or an alkyl or cyclohexyl radical or optionally substituted benzene radical, $X_2$, $X_3$, $X_4$, $Y_2$ and $Y_3$ each denote a hydrogen or halogen atom or an alkyl group and $X_5$ denotes a hydrogen or halogen atom, with the number of the alkyl, benzene and cyclohexyl radicals as substituents together being at most 4, for combatting harmful micro-organisms.

Amongst the compounds of formula (1), those in which at least 2 of the X and Y radicals represent hydrogen atoms, are preferred.

At the same time, compounds of formula (2) 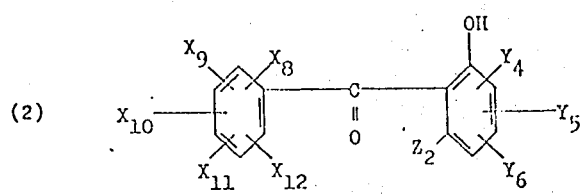

wherein $Z_2$ denotes a halogen atom or an alkyl group with 1 to 4 carbon atoms, $X_8$, $X_9$, $X_{10}$, $X_{11}$, $Y_4$, $Y_5$ and $Y_6$ each denote an alkyl group with 1 to 4 carbon atoms or a hydrogen or halogen atom, and $X_{12}$ and $Y_6$ each denote a hydrogen or halogen atom, with the number of alkyl groups being at most 4, are above all of interest.

Possible halogen atoms for the substituents in formulae (1) and (2) are iodine and above all chlorine and bromine. Possible alkyl groups for the substituents in formulae (1) and (2) are above all straight-chain radicals, for example ethyl, n-propyl or n-butyl radicals, but preferably methyl radicals.

Compounds of formula (3) 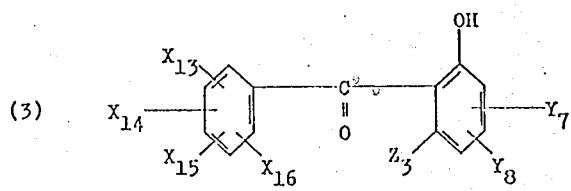

wherein $Z_3$ denotes an alkyl group with at most 2 carbon atoms or a chlorine or bromine atom, $X_{13}$, $X_{14}$, $X_{15}$, $Y_7$ and $Y_8$ each denote an alkyl group with at most 2 carbon atoms or a hydrogen, chlorine or bromine atom, and $X_{16}$ denotes a hydrogen, chlorine or bromine atom, with the number of the alkyl groups being at most 3, should be highlighted.

Amongst the compounds of formulae (2) or (3), those in which at least 3, or 2, of the X and Y radicals, preferably the X radicals, represent hydrogen atoms and the number of alkyl groups is at most 2 are preferred.

Special interest attaches to the 2-hydroxybenzophenones of formula (4) 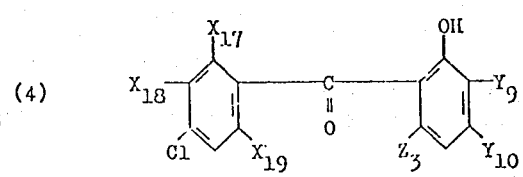

wherein $Z_3$ denotes a chlorine atom or a methyl group, $Y_{10}$ denotes a methyl group or a hydrogen or chlorine atom, and $X_{17}$, $X_{18}$, $X_{19}$ and $Y_9$ each denote a hydrogen or chlorine atom, with at least 3 of the X and Y radicals, preferably 2 of the X radicals and one of the Y radicals, representing hydrogen atoms.

In the forefront of practical interest is the use of 2-hydroxybenzophenones of formula (5) 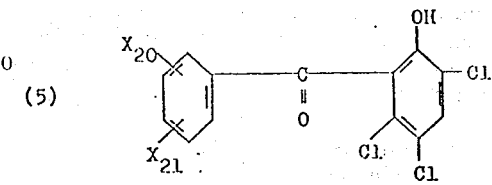

wherein $X_{20}$ and $X_{21}$ each denote a methyl group or a hydrogen or chlorine atom.

Particularly suitable 2-hydroxybenzophenones correspond to the formula (6) 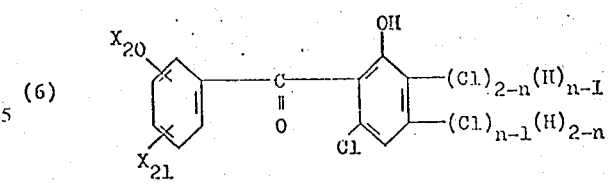

wherein $X_{20}$ and $X_{21}$ have the indicated significance and $n$ is 1 or 2.

Individual specially important 2-hydroxybenzophenones possess the formulae:

(7) 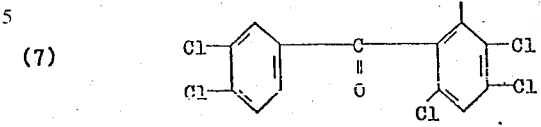

and (8) 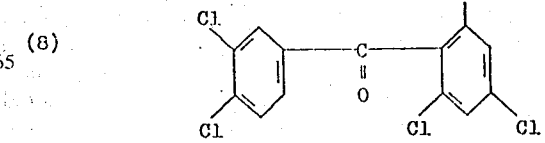

The 2-hydroxybenzophenones of formulae (1) to (8) are known or are manufactured according to methods which are in themselves known, for example from the corresponding phenylbenzoates by the Fries reaction (compare "Baltzly et al. Journal of the American Chemical Society 77, 2522" or "L. F. and M. Fieser, Lehrbuch der organischen Chemie (Textbook of Organic Chemistry) 1954, page 728"). The reaction can be carried out in the melt or in the presence of an organic solvent, for example nitrobenzene. On heating the corresponding phenylbenzoate together with aluminum chloride, the 2-hydroxybenzophenones of formula (1) are then produced.

2-Hydroxybenzophenones of formula (1) are obtained by rearrangement of an ester of formula

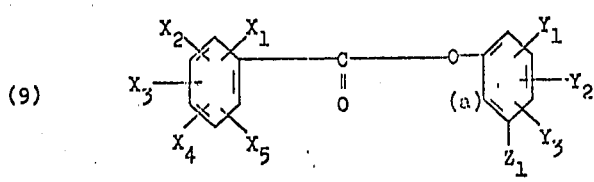

(9)

wherein $X_1$ to $X_5$, $Z_1$ and $Y_1$, $Y_2$ and $Y_3$ have the indicated significance and the position marked (a) has to be unsubstituted.

The starting products of formula (9) are obtained according to known methods, for example by reaction of an appropriate benzoyl halide with an appropriate phenol.

A particularly surprising feature of the compounds of formula (1) is the broad anti-bacterial range of action, which in some of these compounds extends both to gram-positive and to gram-negative bacteria. Here the lack of odour and lack of colour of the compounds of formula (1) is of particular value with regard to the technical aspects of their use.

The present invention also comprises the use of the compounds of formula (1) in combatting pests quite generally. The use of the anti-microbial compounds is possible on a very broad basis, especially for protecting organic substrates against attack by destructive and pathogenic (also phytopathogenic) micro-organisms. Accordingly, the anti-microbial agents mentioned are suitable for use both as preservatives and as disinfectants for technical products of all kinds, in plant protection, in agriculture, in veterinary medicine and in cosmetics.

The 2-hydroxybenzophenones of formula (1) are thus used for finishing or protecting organic material, especially textiles, by incorporating at least one of these compounds into the organic materials to be finished or to be protected or applying such a compound to the surface of the materials.

Amongst the non-textile technical products which can be preserved with the aid of the compounds of formula (1), the following may be selected as examples: glues, adhesives, paints, textile auxiliary agents or finishing agents, dyeing pastes or printing pastes and similar preparations based on organic and inorganic dyestuffs or pigments, also including those which contain casein or other organic compounds as admixtures. Wall and ceiling paints, for example those containing a colour binder which contains albumen, are also protected against attack by pests by an addition of the compounds of formula (1). The compounds can also be used for protecting timber.

The compounds of formula (1) can also be used as preservatives in the cellulose and paper industry, for example for preventing the known formation of slime, caused by micro-organisms, in the apparatuses used for the production of paper.

Furthermore, detergents and cleansing agents having an excellent anti-bacterial and/or anti-micotic action are obtained by combination of the compounds of formula (1) with surface-active substances, especially detergent substances. The compounds of formula (1) can for example be incorporated into soaps or be combined with soap-free detergent or other surface-active substances, especially also non-ionic, detergents (e.g. condensation products of alkyl phenols with ethylene oxide or polyethylene glycols) anionic detergents (e.g. alkyl aryl sulphonates, fatty alcohol sulphonates or alkyl sulphonates), or cationic detergents (e.g. higher alkyl dimethyl benzyl ammonium halides, or higher alkyl trimethyl ammonium halides), or can be combined with mixtures of soaps and soap-free detergent substances, with their anti-microbial activity remaining fully preserved in these combinations. Using aqueous preparations of such detergents and cleansing agents, which contain compounds of formula (1), it is for example possible to impart an anti-microbial finish to textile materials on washing, since the active substance can be substantially absorbed on to the textile material.

Cleansing agents which contain the compounds of the abovementioned formula can also be employed in industry and household, as well as in the foodstuff trade, for example dairies, breweries and abbattoirs. The present compounds can also be used as a constituent of preparations which are used for cleansing and disinfecting purposes.

The action of the compounds of formula (1) can also be utilised in the preservative and disinfectant finishes of plastics. When using plasticisers it is advantageous to add the anti-microbial additive to the plastic dissolved or dispersed in the plasticiser. Appropriately, as uniform a distribution in the plastic as possible should be ensured. The plastics with anti-microbial properties can be employed for utensils of all kinds in which an activity against the most diverse germs, such as for example bacteria and fungi, is desired, such as, for example, in doormats, bathroom curtains, toilet seats, foot grids in swimming baths, wall coverings and the like. Floor polishes and furniture polishes having a disinfectant action are obtained by their incorporation in appropriate wax and polishing compositions.

The compounds of formula (1) can furthermore be used for the preservative and disinfectant finishing of fibres and textiles, in which case they can be applied to natural and synthetic fibres and there display a lasting action against harmful (including pathogenic) micro-organisms, for example fungi and bacteria. Here the compounds can be added before, simultaneously with, or after a treatment of these textiles with other substances, for example dyeing or printing pastes, finishes and the like.

Textiles treated in this way also show a protection against the occurrence of the odour of perspiration, such as is occasioned by micro-organisms.

The anti-microbial active substances can be applied to the textile materials to be protected in the most diverse manner, for example by impregnation or spraying with solutions or suspensions which contain the above-mentioned compounds as an active substance. The active substance content can, depending on the end use, lie between 0.1 and 50 g, preferably between 1 and 30 g, of active substance per litre of treatment liquid.

In most cases, textile materials of both synthetic or natural origin are sufficiently protected against fungal and bacterial attack by a content of 0.1 to 3 percent of active substance. The active substances mentioned can optionally be employed conjointly with other textile auxiliary agents, such as finishing agents, creaseproofing agents and the like.

The use forms of the active substances according to the invention can correspond to the customary formulations of pesticides; for example, agents which contain the said active substances can optionally also contain further additives such as solvents, dispersing agents, wetting agents or adhesives (e.g. an alkali metal salt of carboxy methylcellulose, methylcellulose or polyacryl amide, and the like, as well as other pesticides. In particular, however, the agents can also furthermore contain a solid or liquid diluent or a solid or liquid carrier in addition to the active substance of formula (1).

The active substance content of these agents can lie between 0.1 and 50 g, preferably between 1 and 30 g, of active substance per 1000 g of agent.

EXAMPLE 1

20.9 g of 3,4-dichlorobenzoyl chloride and 16.3 g of 3,5-dichlorophenol are stirred for 1 hour at 150°C under a stream of nitrogen, in the course of which the product of formula

(10) 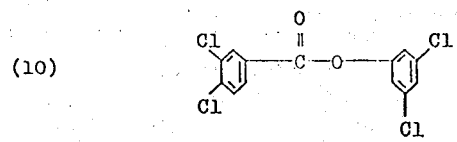

is formed practically quantitatively with elimination of hydrogen chloride (melting point 128° to 129°C). 28 g of aluminium chloride are added over the course of 10 minutes at 140° to 150°C without isolation of the ester. The mixture is stirred for a further 30 minutes at 150° to 160°C and 100 cm3 of chlorobenzene are thereafter added. The solution is poured out onto ice and the mixture is subjected to a steam distillation. The product is filtered off and dried in vacuo at 60°C. Yield: 30 g of light yellow crystals of melting point 118° to 124°C.

After three recrystallisations from cyclohexane, the product I of formula

(11) 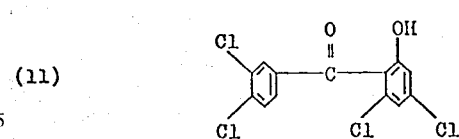

is obtained in the form of colourless crystals. Melting point: 138° to 139°C. As a by-product, the product of formula

(12) 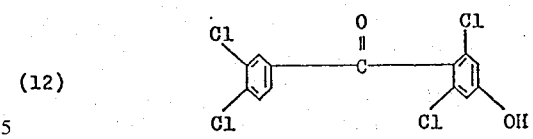

can be isolated in the mother liquor. Melting point: 180° to 181°C.

The compounds II to XXXI of formula

(13) 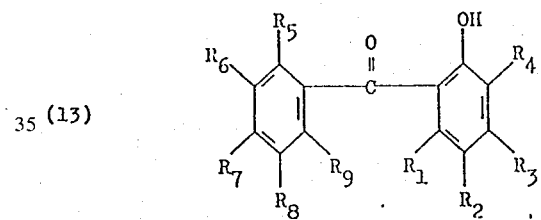

are manufactured in a similar manner to compound I:

Table A

| Compound | $R_1$ | $R_2$ | $R_3$ | $R_4$ | $R_5$ | $R_6$ | $R_7$ | $R_8$ | $R_9$ | Melting point °C |
|---|---|---|---|---|---|---|---|---|---|---|
| I | Cl | H | Cl | H | H | Cl | Cl | H | H | 138 – 139 |
| II | CH₃ | Cl | CH₃ | H | H | H | Cl | H | Cl | 103 – 104 |
| III | CH₃ | H | CH₃ | H | H | H | Cl | H | Cl | 94 – 95 |
| IV | Cl | H | H | H | H | H | Cl | H | Cl | 115 – 116 |
| V | Cl | H | Cl | H | H | H | Cl | H | H | 161 – 162 |
| VI | Cl | Cl | H | Cl | H | H | Cl | H | H | 176 – 177 |
| VII | Cl | Cl | H | Cl | H | Cl | Cl | H | H | 217 – 218 |
| VIII | Cl | Cl | H | Cl | Cl | H | Cl | H | H | 81 – 82 |
| IX | Cl | Cl | H | Cl | H | H | CH₃ | H | H | 141 – 142.5 |
| X | Cl | Cl | H | Cl | H | H | H | H | H | 143 – 144 |
| XI | Cl | Cl | H | Cl | H | H | Br | H | H | 185 – 186 |
| XII | Cl | Cl | H | Cl | CH₃ | H | H | H | H | 125 – 126 |
| XIII | Cl | Cl | H | Cl | H | CH₃ | CH₃ | H | H | 163 – 164 |
| XIV | Cl | Cl | H | Cl | CH₃ | H | CH₃ | H | H | 103 – 104 |
| XV | CH₃ | Cl | CH₃ | H | H | H | H | H | H | 203 – 204 |
| XVI | CH₃ | Cl | CH₃ | H | Cl | H | H | H | H | 91 – 92 |
| XVII | CH₃ | H | CH₃ | H | H | H | Cl | H | H | 132 – 133 |
| XVIII | CH₃ | H | CH₃ | H | H | H | Br | H | H | 147 – 148 |
| XIX | Cl | H | Cl | H | H | H | H | H | H | 156 – 157 |
| XX | Cl | H | Cl | H | Cl | H | Cl | H | H | 105 – 106 |
| XXI | Cl | H | Cl | H | H | H | Br | H | H | 157 – 158 |
| XXII | Cl | H | Cl | H | H | H | CH₃ | H | H | 177 – 178 |
| XXIII | Cl | H | Cl | H | CH₃ | H | H | H | H | 117 – 118 |
| XXIV | Cl | H | Cl | H | Cl | H | H | Cl | H | 107 – 108 |
| XXV | Cl | H | Cl | H | Cl | H | H | H | Cl | 110 – 111 |
| XXVI | Cl | H | Cl | H | H | H | H | H | H | 72 – 73 |
| XXVII | Cl | Cl | H | Cl | Cl | H | H | H | H | 94 – 95 |
| XVIII | CH₃ | Cl | H | H | H | H | H | Cl | H | 122 – 123 |
| XXIX | CH₃ | Cl | CH₃ | Cl | H | H | Cl | H | H | 136 – 137 |
| XXX | CH₃ | Cl | CH₃ | Cl | Cl | H | Cl | H | H | 129 – 130 |
| XXXI | CH₃ | Cl | CH₃ | Cl | Cl | H | H | H | H | 96 – 97 |

EXAMPLE 2

Determination of the minimum inhibitory concentration (MIC) against bacteria and fungi in the gradient plate test 1)+ 2)++

The compounds of formula (13), in suitable formulations (for example as solutions in dimethyl(sulphoxide) of a certain concentration, are mixed with warm brain heart infusion agar (bacteria) or mycophil agar (fungi) respectively. The liquid mixtures are cast onto a solidified wedge-shaped base agar layer and also allowed to solidify.

1)+ W. Szybalski et al., Science 116, 26 (1952).
2)++ Nuesch and Knuesel, "Sideromycins," in the book by Gottlieb and Shaw, "Antibiotics, Mechanism of Action," Vol. 1 (1967), Springer Verlag.

The test organsims are now applied in a line at right angles to the gradient by means of a Pasteur pipette. After an incubation of 24 hours at 37°C (bacteria) or 72 hours at 30°C (fungi) respectively, the length of the germs which have grown on the inoculation stroke is measured and expressed in ppm of active substance.

The results are given in Table B to E below.

Table B

Minimum inhibitory concentrations against *Staphylococcus aureus* (bacteriostasis)

| Compound | MIC in ppm |
|---|---|
| I | 0.2 |
| II | 2 |
| III | 20 |
| IV | 4 |
| V | 2.5 |
| VI | 4 |
| VII | 18 |
| VIII | 4 |
| IX | 20 |
| X | 10 |
| XI | 2 |
| XII | 10 |
| XIII | 10 |
| XIV | 7 |
| XV | 25 |
| XVI | 5 |
| XVII | 25 |
| XVIII | 30 |
| XIX | 10 |
| XX | 1 |
| XXI | 1 |
| XXII | 7 |
| XXIII | 4 |
| XXIV | 0.6 |
| XXV | 2.5 |
| XXVI | 4 |
| XXVII | 4 |
| XXVIII | 4 |
| XXIX | 0.8 |
| XXX | 2.5 |
| XXXI | 4 |

Table C

Minimum inhibitory concentrations against *Escherichia coli* (bacteriostasis)

| Compound | MIC in ppm |
|---|---|
| I | 20 |
| V | 25 |
| XVII | 40 |
| XIX | 20 |
| XX | 10 |
| XXI | 10 |
| XXII | 20 |
| XXIII | 20 |
| XXIV | 20 |
| XXVI | 10 |

Table D

Minimum inhibitory concentrations against *Trichophyton mentagrophytes* (fungistasis)

| Compound | MIC in ppm |
|---|---|
| I | 0.3 |
| II | 2 |
| III | 5 |
| IV | 10 |
| V | 10 |
| VI | 2 |
| VII | 1 |
| IX | 10 |
| X | 10 |
| XI | 4 |
| XII | 10 |
| XIII | 10 |
| XIV | 5 |
| XVI | 3 |
| XVII | 4 |
| XVIII | 4 |
| XIX | 5 |
| XX | 1 |
| XXI | 1 |
| XXII | 10 |
| XXIII | 30 |
| XXIV | 2 |
| XXV | 2 |
| XXVI | 3 |
| XXVII | 10 |
| XXVIII | 3 |
| XXIX | 1 |
| XXX | 1 |
| XXXI | 1 |

Table E

Minimum inhibitory concentrations against *Aspergillus niger* (fungistasis)

| Compound | MIC in ppm |
|---|---|
| I | 6 |
| V | 20 |
| IX | 40 |
| X | 30 |
| XI | 60 |
| XII | 50 |
| XVII | 35 |
| XVIII | 40 |
| XIX | 15 |
| XX | 30 |
| XXI | 15 |
| XXII | 25 |
| XXIII | 3 |
| XXVI | 30 |
| XXVII | 40 |
| XXVIII | 50 |

EXAMPLE 3

Samples of 100 g of cotton cretonne are impregnated with an 0.1 percent strength solution of compounds of formula (13) in isopropanol at 20°C on a padder and subsequently squeezed out to leave a 100 percent liquor uptake.

Samples of 100 g of wool cheviot are also treated in the same manner.

The fabrics dried at 30° to 40°C contain 0.1 percent of active substance relative to their own weight.

To test the action against bacteria, discs of 10 mm diameter of the impregnated fabrics, unsoaked and after soaking for 24 hours at 29°C, are placed on brain heart infusion agar plates which are previously inoculated with *Staphylococcus aureus*. The plates are thereafter incubated for 18 hours at 37°C.

An assessment is made of, on the one hand, the inhibition zone occurring around the discs (IZ in mm) and, on the other hand, the microscopically detectable growth (G in percent) under and/or on the fabric:

Table F

| Substrate (with 0.1% of active substance) | Compound | unsoaked IZ (mm) | unsoaked G (%) | soaked IZ (mm) | soaked G (%) |
|---|---|---|---|---|---|
| Cotton | I | 3 | 0 | 3 | 0 |
|  | VII | 10 | 0 | 7 | 0 |
| Wool | I | 5 | 0 | 3 | 0 |
|  | VII | 3 | 0 | 2 | 0 |

Similar results are also obtained with the other compounds of Table A.

EXAMPLE 4

In order to manufacture an anti-microbial cake of soap, 2.4 g of the compound of formula XX are added to the following mixture: 120 g of base soap in flake form, 0.12 g of the disodium salt of ethylenediaminetetraacetic acid (dihydrate) and 0.24 g of titanium dioxide.

The soap chips obtained by working the mixture on rolls are powdered by means of a rapid-running stirrer and subsequently pressed into a cake of soap.

A concentrated aqueous solution of the anti-microbial soap is admixed to warm brain heart infusion agar in such a way that in incorporation-dilution series with 2, 10, 20 and 100 ppm of active substance is produced. The warm mixtures are poured into petri dishes, allowed to solidify and subsequently inoculated with *Staphylococcus aureus*. After 24 hours incubation at 37°C the minimum inhibitory concentration is determined.

Minimum inhibitory concentration of the anti-microbial soap in ppm of active substance: ≤ 2.

Similar results are also obtained with other compounds of Table A.

EXAMPLE 5

The following mixture is worked for 20 minutes at 150°C on a two-roll mill: 100.00 g of polyvinyl chloride, 19.20 g of di-(2-ethyl-hexyl)-phthalate, 27.00 g of di-(2-ethyl-hexyl)-sebacate, 1.50 g of Ba/Cd laurate, 0.25 g of stearic acid and 7.80 g of a solution of 3.10 g of the compounds of formula (13) in 4.70 g of di-(2-ethyl-hexyl)-phthalate.

The roll nip is so adjusted that 1 mm thick hides are produced which are subsequently pressed for 20 minutes at 165° to 170°C under 1400 kg/cm2.

To test the action against bacteria, 10 mm diameter discs are punched out of the milled plasticised polyvinyl chloride and placed on brain heart infusion agar plates which are previously inoculated with *Staphylococcus aureus*. The plates are thereafter incubated for 24 hours at 37°C.

An assessment is made of, on the one hand, the inhibition zone occurring around the discs (IZ in mm) and, on the other hand, the microscopically detectable growth (G in percent) under and/or on the plasticised polyvinyl chloride.

Table G

| Compound No. | IZ (mm) | G (%) |
|---|---|---|
| I | 3 | 0 |
| XX | 2 | 0 |

Similar results are also obtained with other compounds of Table A.

What we claim is:
1. A disinfectant composition comprising
   1. an effective amount of a 2-hydroxybenzophenone of the formula

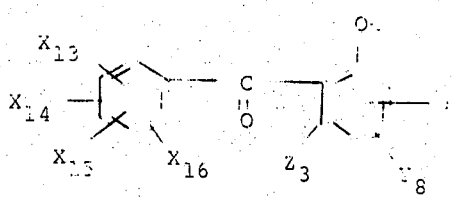

wherein $Z_3$ denotes an alkyl group with at most 2 carbon atoms or a chlorine or bromine atom, $X_{13}$, $X_{14}$, $X_{15}$, $Y_7$ and $Y_8$ each denote an alkyl group with at most 2 carbon atoms or a hydrogen, chlorine or bromine atom, and $X_{16}$ denotes a hydrogen, chlorine or bromine atom, with the number of the alkyl groups being at most 3, and
   2. soap or non-ionic, anionic, or cationic detergents.

2. The composition of claim 1, wherein the 2-hydroxybenzophenone is of the formula

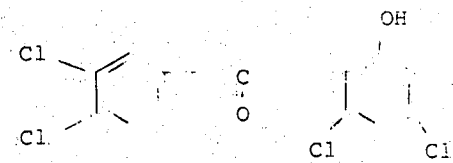

3. The composition of claim 1, wherein the 2-hydroxybenzophenone is of the formula

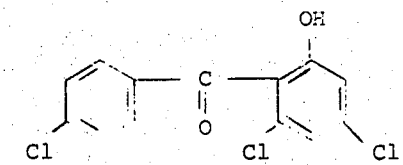

4. The composition of claim 1, wherein the 2-hydroxybenzophenone is of the formula

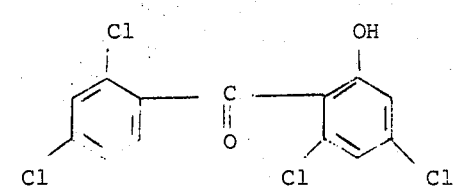

5. The composition of claim 1, wherein the 2-hydroxybenzophenone is of the formula
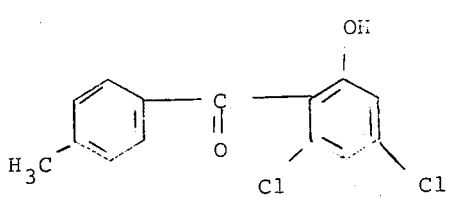
6. The composition of claim 1, wherein the 2-hydroxybenzophenone is of the formula
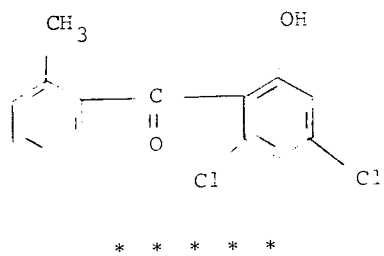
* * * * *